2 Sheets—Sheet 1.
H. WICK, Jr.
RAIL STRAIGHTENING MACHINE.
No. 11,497. Reissued May 28, 1895.
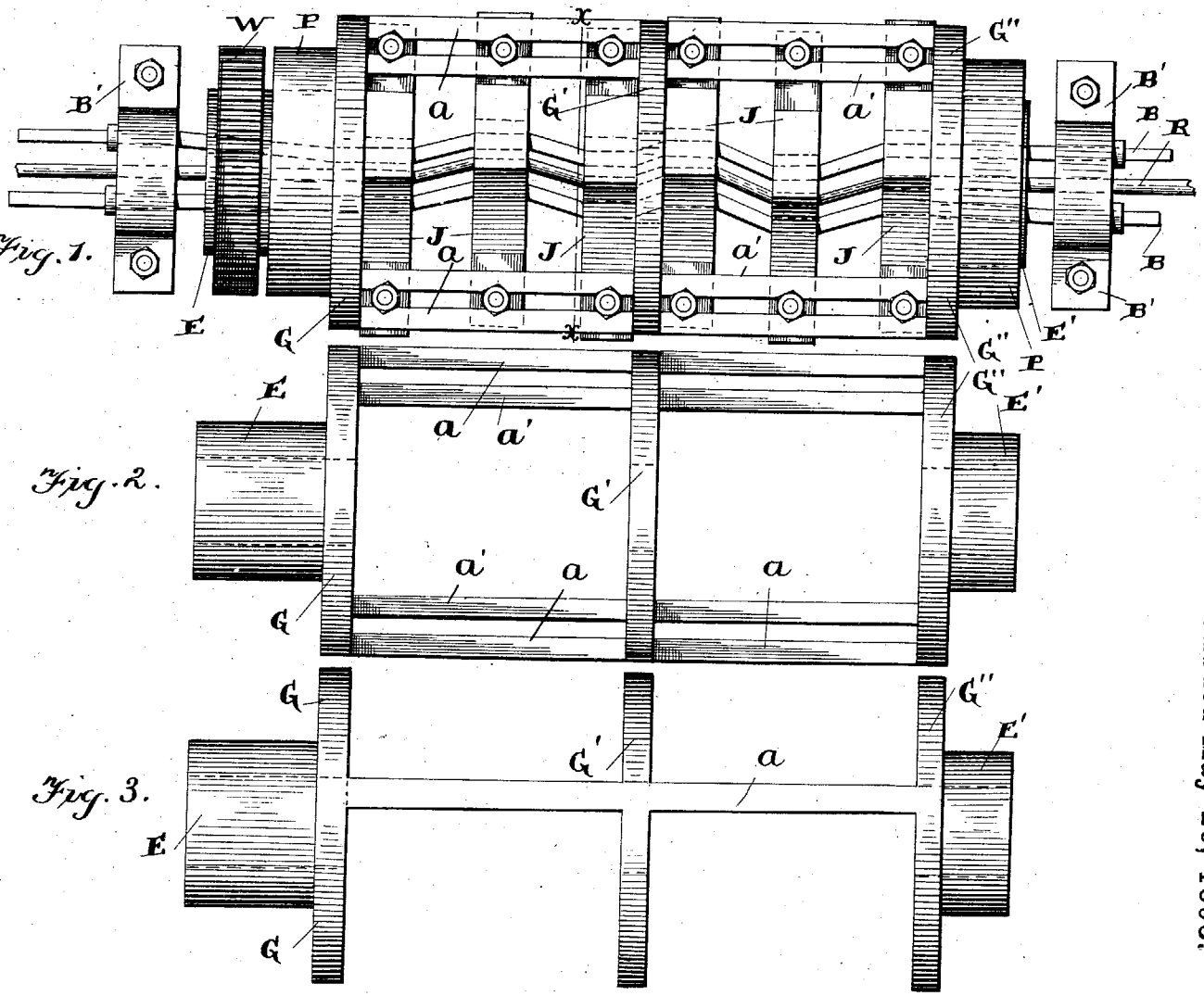
Witnesses
Geo. E. Frech.
James V. Burns.
Inventor
Henry Wick, Jr.
By his Attorneys
Pattison & Nesbit.

H. WICK, Jr.

RAIL STRAIGHTENING MACHINE.

No. 11,497. Reissued May 28, 1895.

Witnesses

Geo. E. Frech

James V. Berard

Inventor

Henry Wick, Jr.

By his Attorneys

Pattison & Nesbit

UNITED STATES PATENT OFFICE.

HENRY WICK, JR., OF CLEVELAND, OHIO.

RAIL-STRAIGHTENING MACHINE.

SPECIFICATION forming part of Reissued Letters Patent No. 11,497, dated May 28, 1895.

Original No. 523,496, dated July 24, 1894. Application for reissue filed October 3, 1894. Serial No. 524,840.

*To all whom it may concern:*

Be it known that I, HENRY WICK, Jr., a citizen of the United States, residing at Cleveland, in the county of Cuyahoga and State of Ohio, have invented certain new and useful Improvements in Rail-Straightening Machines; and I do hereby declare the following to be a full, clear, and exact description of the invention, such as will enable others skilled in the art to which it pertains to make and use it, reference being had to the accompanying drawings, which form part of this specification.

It is a cause of much expense in the manufacture of railroad rails and other like articles, that considerable labor is required to straighten the rail after finishing in the rolls and cooled, in which state it is almost invariably found to be kinked, crooked or curved in one or all directions. The work of such straightening is now done very imperfectly and with considerable labor by means of a power hammer or press. When employing such means, the rail or other article is first straightened so as to bring the surface of the head and flange into or approximately into parallelism with each other, and then the rail is given a quarter-turn axially, and the remaining sides straightened in a similar manner.

The object of the present invention is to provide for the straightening of any or all bends, kinks or crooks in one continuous operation regardless of the direction of such bend, *i. e.*, whether lateral or vertical.

Figure 6:
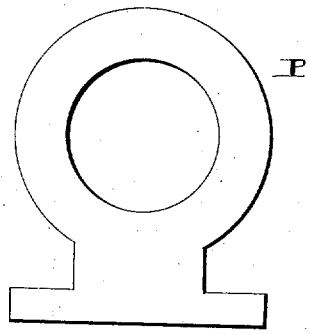
Figure 7:
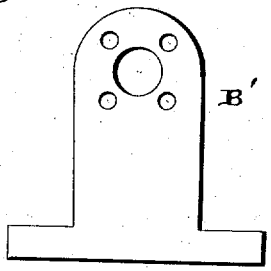
Figure 8:
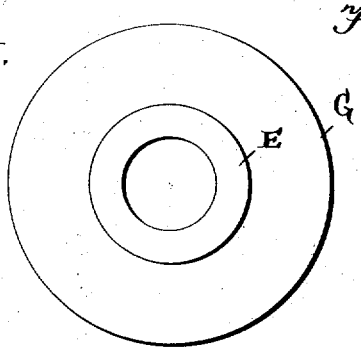
Figure 9:
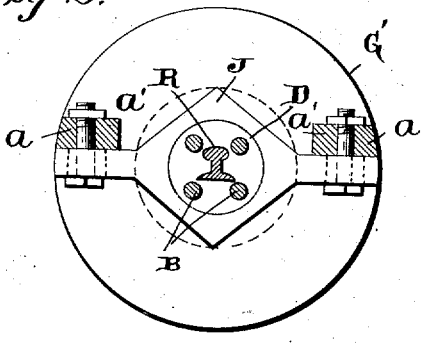
Figure 10:
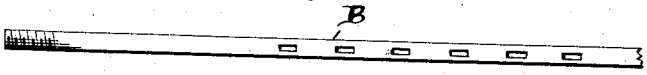
Figure 11:
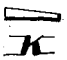
Figure 4:
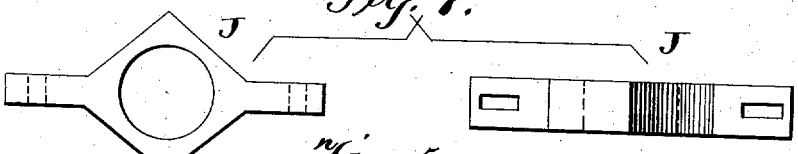
Figure 5:
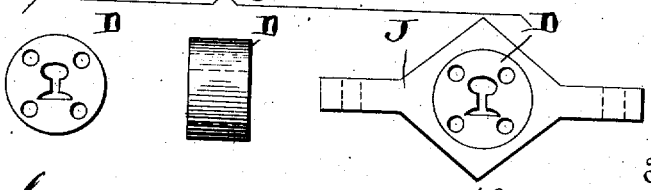

In the accompanying drawings, forming part of this specification, Figure 1 is a top plan view of my improved straightening-machine. Figs. 2 and 3 are views in elevation of the rotating frame, the views being taken at right angles to each other. Fig. 4 shows in side elevation and plan the die journal-box. Fig. 5 illustrates the die in side and edge elevation and also in position in the die journal-box. Figs. 6 and 7 are elevations of the pillow-block and bar-block. Fig. 8 is an end view of the rotating frame. Fig. 9 is a transverse section of the frame, the plane of the section being indicated by the line $x\ x$, Fig. 1. Figs. 10 and 11 are detail views of one of the die-holding bars and keys.

In the practice of my invention, pillow-blocks P P are secured on suitable foundations and in such relation to each other as to form supports for the hollow journals E E′ of the rotating frame. This frame consists of three or more disks G, G′ and G″, the outer disks G G″ being preferably formed integral with the journals E E′, while the middle disk G′ is connected with the outer disk by two pairs of arms $a\ a'$. The bars $a\ a'$ are arranged with such a distance between them as to form slots whereby the die journal-boxes J may be adjustably secured to the frame. The die journal-boxes are provided with lateral arms slotted at their ends for the reception of suitable bolts whereby they may be secured to the bars $a\ a'$. The slots in the arms of the die journal-boxes permit of the adjustment of said boxes transversely of the frame for a purpose hereinafter described.

The die journal-boxes are provided with central openings in which are arranged the dies D, the walls of the openings of the die journal-boxes forming bearings for the dies, which together constitute carriers and holders for the article acted upon.

On one of the journals of the rotating frame is secured a gear-wheel W which intermeshes, in the operation of the machine, with a suitably driven gear, or any suitable means may be employed for rotating the frame. The dies D are provided near their peripheries with a series of holes, one, two, three or more in number for the reception of rods B, which extend through the hollow journals of the frame and have their ends secured in the bar-blocks B′. These bars B serve to prevent the rotation of the dies with the journal-boxes and rotating frame. In order to prevent the dies from moving out of the journal-boxes, keys K are inserted through the bars B on each side of the dies, or any other suitable means such as disks or washers which will overlap the joint between the dies and journal-boxes may be employed for this purpose.

In operating my machine, the journal-box at one end of the frame is adjusted laterally so that the axis of the central opening in the die carried thereby, (which opening preferably corresponds approximately in shape to the cross sectional shape or contour of the articles to be straightened) is a little to one side of the general longitudinal axis of the article to be straightened or the line of feed of the article through the machine. The next journal-box is similarly adjusted, except that the axis of the opening in the die will be on the opposite side of the line of feed or axis of the motion of the frame. This general longitudinal axis or line of feed coincides with or approximately with the axis of rotation of the frame. The distance between the axes of the openings in the dies and the axis of motion of the frame should be such that when a straight portion of the rail or other article to be straightened, is bent aside a distance equal to the distance between these axes, the material will not be deflected beyond its elastic limit, so that the article so deflected will return to a straight or normal position. The next or third die will be adjusted on the same side of the axis of motion of the frame as the first die, and the fourth die will correspond in position to the second die, and so on throughout the entire length of the frame, the alternate dies corresponding with each other as regards their relation to the axis of motion of the frame, or one or more dies may be set with their centers in a line with the feed of the machine.

The die journal-boxes are adjusted a distance apart longitudinally of the frame in correspondence with the kind or degree of curvature to be corrected—that is to say, if the curves in the article to be straightened are long, the distance between adjacent dies will also be considerable, but if the curves are sharp, the distance between the adjacent dies will be proportionately decreased. In no case should the adjacent dies be so close together as to have any shearing action upon the metal.

As the curves, kinks are crooks vary considerably as regard their length and depth in the same article, it is obvious that if all the dies were adjusted the same distance apart longitudinally of the frame, the shorter kinks or crooks would be not corrected. In order to provide for the removal of these small kinks or crooks, two methods of adjustment of the die journal-boxes may be employed.

First, the die journal-boxes may be divided into two or more series, each series containing three or more die journal-boxes and dies. In such case, the die journal-boxes of the first series would be suitably adjusted for operation on long curves. The next series would have the die journal-boxes a little closer together for operation on shorter curves; and so on for each series employed.

Second, the distance between adjacent journal-boxes may be gradually decreased from one end of the machine to the other—that is to say, the distance between the second and third die journal-boxes would be less than the distance between the first and second.

Not only must the die journal-boxes be adjusted longitudinally of the frame in proportion to the length of the curves to be operated on, but they must also have a correspondingly proportional adjustment transverse of the frame, to regulate the transverse or lateral throw of the dies, or to set the center of one or more dies in a line with the feed of the machine—that is to say, those dies which are designed to operate upon long curves may have a greater eccentricity as regards the relation of the axis of the opening in the die and the axis of motion of the frame, than those dies which are placed closer together. This decrease in what might be termed the eccentricity or throw of the dies in closer longitudinal relation to each other, is necessary in order to prevent any rupture or break of the bar operated on.

It will be readily understood by those skilled in the art, that if the bed or curve imparted by the dies to a straight portion of the rail is just within the elastic limits of the material, the greater deflection resulting from the operation of the dies on a crooked or deformed portion, will produce a set in the material, and as such greater deflection is necessarily toward or to the general longitudinal axis of the article, a set will take place in such axis.

It is a characteristic of my invention that as the crook or bend in the rail is made either by accident or by unequal contraction in the process of cooling, a disturbance in the relation of the particles of metal exist at the point of deformity, in consequence of which the degree of stress that will spring the undeformed portions to the limit of elasticity, will, acting upon the deformed portions, restore in such portions normal conditions, so that the deformed portions of the rail instead of springing back upon the release of stress, will remain straight.

Any suitable means known in the art for effecting the longitudinal movement of the bar or rail may be employed for feeding such bar or rail into the machine herein shown and described.

Having thus described my invention, what I claim as new, and desire to secure by Letters Patent, is—

1. In a machine for straightening bars, rails, &c., a series of dies three or more in number having openings in which the bar or rail is to be passed by a lengthwise movement or feed, said dies being successively arranged with their openings out of line with each other and preferably on opposite sides of the central line of feed or movement, in combination with suitable mechanism for imparting to each die a movement whereby the central or middle point of its opening shall be caused to move around the central line of feed and at right angles thereto and with suitable mechanism for preventing the rotation of the dies on their own axes as also of the bar or rod on its own axis, substantially as set forth.

2. In a machine for straightening bars, rails &c., the combination of a series of three or more dies having openings therein whose walls bear upon the article in such manner as to prevent its axial rotation, and means for so shifting the dies that the axes thereof will move around the general longitudinal axis of the article to be straightened, substantially as set forth.

3. In a machine for straightening bars, rails &c., the combination of a rotating frame, a series of dies having openings therein conforming approximately to the cross-sectional shape of the article to be straightened, a corresponding series of journal-boxes for the dies, so mounted in the frame that alternate dies will have their axes on one side of the axis of motion of the frame and the axes of the intermediate dies on the opposite side of said axis, and means for preventing axial rotation of the dies, substantially as set forth.

4. In a machine for straightening bars, rails &c., the combination of a series of three or more dies having openings therethrough corresponding approximately to the cross-sectional shape or contour of the article to be straightened, means for so shifting the dies that the central or middle point will move around the line of feed through the machine, successive dies moving in circles having shorter radii than the circles described by the preceding dies, substantially as set forth.

5. A machine for straightening bars, rails, &c., comprising a plurality of dies non-rotatably held in respect to and independent of the article being acted upon, and die carriers moving said dies around the central line of feed of the machine.

6. A machine for straightening bars, rails, &c., comprising dies non-rotatably held in respect to and independently of the article acted upon, and die carriers moving said dies in opposite directions around the central line of feed of the machine.

7. A machine for straightening bars, rails, &c., comprising dies carrying the article to be straightened, a die carrier or carriers deflecting one or more of said dies to one side of the line of feed of the machine, and a holder for said movable die or dies to prevent it from rotating in respect to the article.

In testimony whereof I hereunto affix my signature in the presence of two witnesses:

HENRY WICK, JR.

Witnesses:

A. S. PATTISON,
J. M. NESBIT.